United States Patent [19]

Parliment et al.

[11] Patent Number: 5,053,236

[45] Date of Patent: Oct. 1, 1991

[54] GENERATION OF AROMA DURING MICROWAVE COOKING

[75] Inventors: Thomas H. Parliment, New City, N.Y.; Joseph J. Cipriano, Cranbury; Richard Scarpellino, Ramsey, both of N.J.

[73] Assignee: Kraft General Foods, Inc., Glenview, Ill.

[21] Appl. No.: 411,231

[22] Filed: Sep. 22, 1989

Related U.S. Application Data

[62] Division of Ser. No. 166,063, Mar. 9, 1988, abandoned.

[51] Int. Cl.$^5$ .................. A23L 1/226; A23L 1/227
[52] U.S. Cl. ........................... 426/234; 426/241; 426/242; 426/243; 426/99; 426/107; 426/533; 426/89; 426/96
[58] Field of Search ............ 426/99, 107, 234, 241–243, 426/533, 89, 96

[56] References Cited

U.S. PATENT DOCUMENTS

| | | | |
|---|---|---|---|
| 3,256,101 | 6/1966 | Arns . | |
| 3,478,015 | 11/1969 | Onishi et al. | 426/650 |
| 3,547,659 | 12/1970 | Cort . | |
| 3,739,064 | 6/1978 | Rizzi | 426/548 X |
| 3,743,716 | 7/1973 | Rizzi et al. | 426/49 |
| 3,751,270 | 8/1973 | Rizzi | 426/548 |
| 3,949,094 | 4/1976 | Johnson et al. | 426/99 |
| 4,252,832 | 2/1981 | Moody | 426/241 |
| 4,316,070 | 2/1982 | Prosise et al. | 219/10.55 E |
| 4,448,791 | 5/1984 | Fulde et al. | 426/243 X |
| 4,735,812 | 4/1988 | Bryson et al. | 426/243 X |

FOREIGN PATENT DOCUMENTS 7115670 4/1971 Japan .................. 426/650

OTHER PUBLICATIONS

The Maillard Reaction in Foods and Nutrition, George Waller, Milton Feather, Editor, Chapter titled The Variety of Odors Produced in Maillard Model Systems and How They are Influenced by Reaction Conditions, M. J. Lane, & E. Nursten–1983 ACS, pp. 141–157.

*Primary Examiner*—Joseph Golian
*Attorney, Agent, or Firm*—Thomas A. Marcoux; Thomas R. Savoie; Linn I. Grim

[57] ABSTRACT

An aroma-generating flavor composition is described which will generate desirable aromas when a food and/or a package is subjected to microwave radiation. The composition comprises an aroma-generating material which is either a sugar alone or in combination with an amino acid source. Also, the composition contains an effective amount of a microwave susceptible material in conductive heat transfer relationship with the sugar and/or amino acid source, the microwave susceptible material when irradiated with microwave energy provides sufficient heat to cause a chemical reaction thereby generating desirable aromas.

14 Claims, No Drawings

GENERATION OF AROMA DURING MICROWAVE COOKING

This application is a division of application Ser. No. 166,063, filed Mar. 9, 1988 now abandoned.

BACKGROUND OF THE INVENTION

1. Field of the Invention

This invention relates to the microwave preparation of food. More particularly, it relates to the generation of food aromas during the microwave preparation of food. This invention especially relates to compositions which will generate aromas of cooking food during microwave preparation of comestibles.

2. Description of the Prior Art

Microwave ovens for home use have found widespread accePtance. The fact that the cooking and/or reheating of food in the domestic microwave oven is achieved in such relatively short periods of time is Probably the principal reason for the high sales of these units in recent years.

Essentially all domestic microwave ovens operate at 2450 MHz. The dielectric properties of food at this frequency parallels those of water which is the principal lossy constituent of food. The absorption of microwave energy by food by the interaction of the dipole water molecule in the microwave field results in a localized heating resulting in the desired cooking or reheating. Despite the widespread use of microwave ovens, a major shortcoming involved in their use is the lack of desirable aroma release from comestibles during their preparation by microwave heating. The reason for this may be attributed to the basic functioning of the microwave oven. Since the action of microwave energy on the dipole water molecule is the principal cause of heat generation within the water-containing comestible, the maximum temperature obtainable on a comestible surface exposed to microwave energy is about 100° C. In a thermal oven, normal cooking and roasting temperatures are in the range of about 175° to about 235° C. (350°–450° F.). Further, the short cooking times achieved by using a microwave oven may also contribute to the lack of aroma generation from the comestible. It is thought that the combination of temperatures in excess of 100° C. and periods of time in excess of about 5 minutes are necessary for the typical generation and release of the familiar roasting or cooking aromas. Thus, the very features of the microwave oven which make it so attractive to people anxious to quickly prepare a tasty meal, prevent the generation of kitchen aromas which would be harbingers of the upcoming meal.

U.S. Pat. No. 3,547,659 addressed a somewhat similar problem where bread, prepared by a continuous process which eliminated a heretofore employed slow fermentation step, was devoid of the flavor and aroma normally associated with freshly baked bread. The disclosed invention related to a mixture of four amino acids and either glycerol or propylene glycol which was heated at 50° to 175° C. for 5–60 minutes and then thoroughly mixed into the unbaked dough. Bread prepared from this dough was said to process the characteristic flavor and aroma of freshly baked bread. The contribution of the individual amino acids, the glycerol or the glycol to the desired flavor and aroma was not disclosed in this patent.

Maillard reactions are known by those skilled in the art to produce desirable food aromas. Representative of the knowledge is the Chapter entitled "The Variety of Odors Produced In Maillard Model Systems And How They Are Influenced By Reaction Conditions" by M. J. Lane and H. E. Nursten which appears in a book entitled The Maillard Reaction In Foods And Nutrition, Editors George R. Waller and Milton S. Feather 1983.

The generation or release of aromas from comestibles being prepared in a microwave oven would enhance the usefulness of this appliance, as well as increasing the acceptance of microwaveable convenience foods provided with an appropriate aroma-generating composition.

It is an object of this invention to provide aroma generation during microwave preparation of comestibles.

It is another object of the invention to provide aroma-generating compositions for use when comestibles are prepared in a microwave oven.

It is a further object of this invention to provide a means for providing aroma with a comestible package for sale to, and preparation in a microwave oven by, a consumer.

The achievement of these and other objects will be apparent from the following description of the subject invention.

SUMMARY OF THE INVENTION

In accordance with the present invention, it has been found that microwave cooking can be made pleasant and enjoyable by including, in the microwaveable package of a comestible, an aroma-generating composition which, upon being subjected to microwave energy, generates and releases an aroma which people associate with the cooking of the particular comestible. In particular, by placing a sugar alone or in combination with an amino acid source in conductive heat transfer relationship with a microwave susceptible material and affixing the resulting composition to a microwaveable comestible or microwaveable packaging, an aroma can be produced when the comestible and/or package is subjected to microwave energy.

More particularly, this invention relates to an aroma-generating composition comprising: (a) a first mixture of an aroma-generating material comprising a sugar alone or in combination with an amino acid source and (b) an effective amount of a microwave susceptible material in conductive heat transfer relationship with said first mixture, said amount of said microwave susceptible material being effective, when irradiated with microwave energy, to provide sufficient heat to cause a chemical reaction, typically a caramelization reaction, Maillard reaction or non-enzymatic browning reaction causing said aroma-generating material to generate and release an aroma.

In another aspect of this invention, the aroma-generating composition is combined with a microwaveable comestible and/or a microwaveable package so that an aroma is generated and released when the comestible is prepared in a microwave oven.

In yet another concept of this invention, a method of producing an aroma comprises subjecting the aroma-generating composition described above to an effective amount of microwave energy.

DESCRIPTION OF THE PREFERRED EMBODIMENTS

The present invention relates to providing cooking aromas when comestibles are prepared in a microwave oven. In many situations, the preparation time in a microwave oven for a given comestible is too short for the comestible to generate and release the normal aromas associated with its cooking. Therefore, any aroma-generating system which may be employed to provide the usual cooking aromas and which requires heat to release its aroma must be heated quickly in order to generate the required aroma within the short-term microwave preparation process.

In accordance with the present invention, a composition is provided which generates an aroma when it is subjected to microwave radiation. Since the composition is intended for use with a comestible being prepared in a microwave oven, it hardly must be stressed that the aroma produced by the composition should be one normally associated with the cooking of the subject comestible.

The aroma-generating composition of this invention comprises two elements: (a) a material or materials to produce the aroma via chemical reactions and (b) a material which generates a sufficient source of rapid heat in the microwave thereby causing the aroma to be generated by virtue of the heat-generated chemical reactions.

The aroma-generating material can comprise a sugar alone in which case when heated rapidly in the microwave oven through the interaction of the microwave susceptible material, the sugar will undergo a caramelization reaction producing a caramel, burnt sugar, cotton candy flavor and a brown color. The aroma-generating material may also comprise a mixture of a sugar and an amino acid source. In this case, when the combination becomes heated by virtue of being placed in conductive heat transfer relationship with a microwave susceptible material during microwave exposure, the materials undergo a Maillard reaction or a non-enzymatic browning reaction thereby forming a myriad of flavors (depending upon the specific sugar and amino acid source) and a brown color. In either event, the temperatures necessary for the caramelization reaction, Maillard reaction or non-enzymatic browning reaction will range from approximately 110° C. to 200° C. This temperature range can be supplied by the incorporation of one or more of the microwave susceptible materials placed in conductive heat transfer relationship with the aroma-generating material.

The sugar should preferably consist of a monosaccharide, disaccharide or mixtures and it may be reducing or non-reducing. Preferably the sugar is a reducing sugar, most preferably a reducing monosaccharide or mixture of monosaccharides. Examples of reducing monosaccharides include but are not limited to hexoses and/or pentoses, either alone or in combination with one another. Typical hexoses include mannose, glucose, fructose, galactose, talose, gulose, idose, 6-deoxy-L-mannose, 6-deoxy-L-galactose, rhamnose etc. Typical pentoses include ribose, arabinose, lyxose, xylose, etc.

The amino acid source may comprise a single amino acid which is specifically associated with the desired flavorant or a mixture of various amino acids. Protein hydrolysates may also be employed. The hydrolysed protein may be a chemically hydrolysed protein from plant or animal sources, autolysed yeast extracts from brewer's or baker's yeast and soy sauce from enzymatically degraded soy or soy and wheat mixtures. Hydrolysates are well known and readily obtainable from a variety of proteinaceous materials. Vegetable protein hydrolysates, for example, may be obtained from wheat germ, corn gluten, soy protein, linseed protein, peanut press cake, yeast and the like.

When the aroma-generating material is a combination of a sugar and an amino acid source the ratio of these two ingredients (sugar to amino acid source) may vary from 1:2 to 20:1. As previously mentioned, sugar may make up 100% of the aroma-generating material if a burnt-sugar type flavor resulting from caramelization is desired.

To ensure that sufficient heat can be rapidly supplied to generate an aroma via chemical reactions while the comestible and/or package is being prepared in a microwave oven, it is important that a source of heat be provided in conductive heat transfer relationship with the aroma generating material(s). In this fashion, the heat generated chemical reaction will take place within a time period of from about 10 to about 180 seconds, thereby generating the aroma within the microwave oven so that those in the vicinity will be apprised of the preparation of the comestible. A microwave susceptible material is an ideal means for providing this source of heat since it will only provide heat when it is radiated with the microwave energy available in the microwave oven. The useful microwave susceptible materials preferably should be those which have a Curie temperature thereby preventing a temperature runaway when the microwave susceptible material is radiated with microwaves. Several solid materials find utility as the microwave susceptible material for use of the subject invention. Thus, ferrites and magnetites are solid materials which become heated when subjected to microwave energy and absorb energy up to their Curie temperature beyond which power absorption decreases and heating does not continue above that point. U. S. Pat. Nos. 2,830,162, 4,266,108 and 4,663,508 disclose the use of ferrites and U.S. Pat. No. 4,542,271 discloses the use of magnetite as sources of heat in microwave ovens. Films of microwave reactive material may also be employed. Suitable microwave interactive materials of this type which can be utilized in practice of the present invention include metalized layers of polyethylene terephthalate or polyester as disclosed in U. S. Pat. Nos. 4,533,010, 4,590,349 and 4,594,492. A number of microwave reactive liquids can also find use in the subject invention. Organic liquids which possess a high dielectric loss factor as well as a high boiling point i.e. greater than 150° C. may be employed. The microwave reactive liquids are preferably selected from the following groups; polyols between $C_2-C_6$; polyoxyethylene sorbitan esters i.e. Tweens; sorbitan esters i.e. Spans; and acetates of glycerol, i.e., monoacetin, diacetin and triacetin and combinations of liquids representative of two or more of the groups. Most preferred liquids are glycerol and propylene glycol. Liquids of this type and their use as microwave-susceptible materials are disclosed in a copending application identified as Ser. No. 166,062 filed Mar. 9, 1988, now U.S. Pat. No. 4,795,649 which issued Jan. 3, 1989. Additionally, combinations of microwave susceptible materials may be employed, i.e. ferrite solid materials in combination with glycerol.

To most effectively practice this invention, the aroma-generating material is placed in conductive heat transfer relationship with the microwave susceptible material. The microwave susceptible material, whether it be a solid or liquid material, is capable of converting microwave energy to heat. Thus, where a ferrite or magnetite containing solid is employed, the aroma-generating material may merely be placed in contact of the solid ferrite or magnetite. In a similar fashion, when a film of microwave susceptible material is employed, again the aroma-generating material is merely placed in contact with the polyester film. Ideally, this contact can be assured by means of an adhesive or a securing strap of microwave inert material. The size of a solid microwave susceptible material may vary with the proviso that the solid material generates sufficient heat when exposed to microwave irradiation to initiate the heat generated chemical reaction within from 10 seconds to 180 seconds thereby generating and releasing the aroma.

When one of the above-described microwave susceptible liquids is employed as the source of heat in the composition of this invention, it is most conveniently employed by admixing it with the aroma-generating material. This may effectively be achieved by combining the aroma-generating material and the microwave susceptible liquid therewith. It has been found that where the microwave susceptible liquid is employed it will consitiute 10 to 99, preferably 75 to 95 weight percent of the total composition of the aroma-generating material plus microwave susceptible liquid.

Optionally a fusible encapsulating agent may be incorporated into the aroma-generating flavor composition to act as a carrier for the total system preventing diffusion of any of the components of the system, i.e. into the packaged comestible away from the desired point of application. One class of materials found particularly useful in providing this function are the lipids. Lipids are semisolids at room temperature and are fusible at temperatures sufficiently below the normal cooking temperatures encountered in a microwave oven. In this manner, they will rapidly become liquid when in contact with the microwave susceptible material thereby permitting the aroma-generating materials to undergo their chemical reactions. Useful lipids or fats include such animal and vegetable fats as lard, tallow, butter and mono, di and triglycerides. Also, the fusible encapsulating agent may comprise a high boiling ester or organic acid, waxes, such as carnuba and beeswax and parafins. The fusible encapsulating agent need not be food approved if, for example, it is applied on microwave packaging not in direct contact with the comestible. However, if it is in contact with the comestible, either adjacent to or topically applied, it should be food approved. Since the aroma-generating materials which are in conductive heat transfer relationship with a microwave susceptible material must rapidly reach a high temperature to generate aroma via chemical ractions, it is important that the amount of the fusible encapsulating agent not be in excess thereby prohibiting the composition from rapidly reaching the desired high temperature.

The aroma-generating compositions of this invention are particularly effective when combined with microwaveable packaged comestibles. The aroma-producing composition should ideally be affixed to the comestible package in a manner such that when the comestible is heated in the microwave oven, usually in the package in which it was purchased, the aroma generated from the composition of the subject invention is released into the microwave oven and then to the surrounding environment providing those in the vicinity with an aroma of the comestible being prepared. Topical application of this aroma-generating system to a food product provides an effective means for achieving aroma enhancement during microwave cooking. With the availability of numerous sugars and amino acid sources, the possibility exists for providing aromas for most microwaveable comestibles. Examples of useful aromas produced in accordance with this invention include but are not limited to the following: burnt sugar, caramel, cotton candy, chicken skin, bready, cereal, potato chip, meatlike, chicken, rye crisp, corn chip, celery, chocolate, toffee, fruity, nutty and the like.

The following examples illustrate the practice of this invention.

EXAMPLE 1

A aroma-generated flavor system was prepared by mixing together 0.05 gram (g.) cysteine, 0.05 g. Proline, 0.1 g. ribose and 0.5 g. glycerol. This mixture was placed on filter paper which was inserted into a 650 watt microwave oven and subjected to high power for 40 seconds. A very intense and desirable aroma of roasted chicken skin was detected which filled the environment outside the microwave oven.

EXAMPLE 2

A mixture consisting of 0.5 g glycerol and 0.1 g. ribose was prepared. This was placed in a 650 watt microwave oven and subjected to high power for 40 seconds. A pleasant aroma of burnt sugar was observed.

EXAMPLE 3

Several mixtures of aroma-generating materials were prepared and each was placed on a solid microwave susceptible material. The combination in each case was placed in a 650 watt microwave oven at high power setting for 15 seconds to generate a given aroma.

The details of the specific sugar, amino acid source, ratio of sugar to amino acid and description of aroma generated are set forth below in Table I.

TABLE I

| Sugar | Amino Acid Source | Ratio of Sugar To Amino Acid | Aroma |
| --- | --- | --- | --- |
| Ribose | Cysteine | 1:1 | Chicken Skin |
| Ribose | Proline | 1:1 | Bready, Cereal |
| Ribose | — | — | Caramel |
| Ribose | Yeast Extract | 1:2 | Brown, Sweet Cereal Aroma |

The specific microwave susceptible material was a ½"×2" strip of a microwave absorbing conductive metallic film fixed to an inert substrate manufactured by E. I. Dupont, Inc. of Wilmington, Del.

EXAMPLE 4

Several mixtures of aroma-generating materials were prepared in combination with a microwave susceptible liquid. The combinations were placed on individual filter papers or paper plates and each was separately microwaved for 30 seconds in a 650 watt microwave oven at the high power setting. The details of the specific sugar, amino acid source, amounts of each utilized, and the description of the aroma generated are set forth below in Table II.

TABLE II

| Microwave Susceptible Liquid | Sugar | Amino Acid Source | Aroma |
|---|---|---|---|
| Glycerol 0.5 g | Ribose 20 mg | Proline 10 mg<br>Cysteine 10 mg | Chicken Skin |
| Tween 60 0.5 g Polyoxyethylene (20) Sorbitan Monostearate (ICI Americas Inc.) | Ribose 10 mg | Proline 10 mg<br>Methionine 2 mg | Potato Chip Character |
| Glycerol 0.5 g | Ribose 50 mg | Proline 50 mg | Biscuit |
| Glycerol 0.5 g | Ribose 10 mg | Serine 10 mg | Roasted (Cereal-Like) |
| Glycerol 0.5 g | Ribose 10 mg (Sodium Pyrophosphate 10 mg elevates pH to accelerate caramelization reaction) | — | Caramel |
| Glycerol 0.5 g | Ribose 10 mg | Cysteine 10 mg | Rice Cake, Meaty |

EXAMPLE 5

An aroma generating system was prepared which contained the following ingredients:

| Ingredient | Amount |
|---|---|
| Glycerol | 2.5 g. |
| Ribose | 0.25 g. |
| Proline | 0.25 g. |
| Total | 3.0 g. |

This mixture was topically applied to 10 g. of a starch-based puffable snack product (known in the trade as a half product). As a control for comparison purposes, an untreated 10 g. sample of the puffable snack product was also prepared. Both products were separately heated in a 650 watt microwave oven at the high power setting for 33 seconds. Both products displayed good puffability, but the treated sample also exhibited an attractive brown color and a desirable baked (toasted) aroma missing in the control sample.

EXAMPLE 6

The process set forth in Example 5 was repeated with the exceptions that the amino acid methionine was added at a level of 0.025 g. to the glycerol/ribose/proline mixture. The mixture was again topically applied to a puffable snack product and compared to a control. After microwaving, a desirable potato chip aroma was noted in the treated sample during product preparation.

We claim:

1. A method of producing an aroma comprising:
   (a) placing an aroma-generating material comprising a sugar alone or in combination with an amino acid source in conductive heat transfer relationship with a microwave susceptible material, said microwave susceptible material being capable of providing sufficient heat to produce a temperature within the range of rom 100° C. to 200° C. upon exposure to microwave radiation to cause a chemical reaction causing said aroma-generating material to generate an aroma; and
   (b) irradiating the combination of step (a) with an effective amoung of microwave energy for from 10 seconds to 180 seconds to generate an aroma.

2. The method of claim 1 wherein said sugar comprises a monosaccharide, disaccharide or combination thereof.

3. The method of claim 2 wherein said sugar is a reducing monosaccharide.

4. The method of claim 1 wherein said mixture includes an amino acid source selected from the group consisting of amino acids, protein hydrolysates and combinations thereof.

5. The method of claim 1 wherein the aroma generating material contains a sugar to amino acid source ratio of from 1:2 to 20:1.

6. A method according to claim 1 wherein the microwave susceptible material is an organic liquid which possesses a high dielectric loss factor and a boiling point greater than 150° C.

7. A method according to claim 6 wherein the organic liquid is selected from the group consisting of polyols between $C_2$ to $C_6$, polyoxyethylene sorbitan esters, sorbitan esters, acetates of glycerol and combinations thereof.

8. A method according to claim 7 wherein said liquid is glycerol.

9. A method according to claim 7 wherein said liquid is propylene glycerol.

10. A method according to 1 wherein the microwave susceptible material comprises ferrite.

11. A method according to claim 1 wherein the microwave susceptible material comprises magnetite.

12. A method according to claim 1 wherein the microwave susceptible material has a Curie temperature.

13. A method according to claim 1 wherein the microwave susceptible material comprises polyester film.

14. A method according to claim 1 wherein the polyester film comprises metallized layers of polyethylene terephthalate.

* * * * *